United States Patent
Barnes et al.

(10) Patent No.: US 7,617,293 B1
(45) Date of Patent: Nov. 10, 2009

(54) SERVICE ACCESS ARCHITECTURE

(75) Inventors: James D. Barnes, Overland Park, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 841 days.

(21) Appl. No.: 10/848,240

(22) Filed: May 18, 2004

(51) Int. Cl.
  *G06F 15/16* (2006.01)
  *G06F 15/173* (2006.01)

(52) U.S. Cl. .............. 709/217; 709/201; 709/202; 709/203; 709/218; 709/219; 709/238

(58) Field of Classification Search ............ 709/217, 709/201–203, 218–219, 225, 238–242, 250
See application file for complete search history.

(56) References Cited

U.S. PATENT DOCUMENTS

| | | | |
|---|---|---|---|
| 6,169,793 B1 * | 1/2001 | Godwin et al. | 379/221.13 |
| 6,813,670 B1 * | 11/2004 | Yao et al. | 710/302 |
| 2001/0052013 A1 * | 12/2001 | Munguia et al. | 709/225 |
| 2003/0191970 A1 * | 10/2003 | Devine et al. | 713/201 |
| 2004/0212635 A1 * | 10/2004 | Mussini | 345/700 |
| 2006/0031392 A1 * | 2/2006 | Lunetta et al. | 709/217 |

OTHER PUBLICATIONS

Petriu et al. "Architecture-based performance analysis applied to a telecommunication system"; Transactions on Software Engineering; Nov. 2000, vol. 26, Issue: 11, pp. 1049-1065.*
Bond et al. "An open architecture for next-generation telecommunication services"; ACM Transactions on Internet Technology; vol. 4, Issue 1 (Feb. 2004), pp. 83-123.*

* cited by examiner

*Primary Examiner*—Vivek Srivastava
*Assistant Examiner*—Lin Liu

(57) ABSTRACT

A service access architecture to enable customer access to telecommunications provider services is provided. The service access architecture includes a service layer providing a standard interface for communication with customer applications to access network systems and data systems of the telecommunications provider. The service access architecture also includes a device/data layer maintaining the network systems and data systems of the telecommunications provider. The service access architecture includes an adaptation layer coupled to communicate, via at least one broker of the adaptation layer, with the service layer and to communicate, via at least one adapter of the adaptation layer, with the device/data layer, the adaptation layer operable to interface between the service layer and the device/data layer. A method is also provided for a customer of a telecommunications provider to gain access to the telecommunications provider's services and applications using a customer application.

21 Claims, 1 Drawing Sheet

SERVICE ACCESS ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the accessing of services and information within an enterprise. More particularly, embodiments of the present invention allow customers of a telecommunications provider to access the telecommunications provider's services and information in a secure and consistent manner.

BACKGROUND OF THE INVENTION

A telecommunications provider might offer services such as local, long distance, and wireless services that might include text messaging, three-way calling, and location-based services, as well as more traditional telephony services. Such services can be referred to collectively as network systems, network capabilities, or network services. The telecommunications provider might wish to allow access to these network systems to other enterprises that are customers of the telecommunications provider. The telecommunications provider might also wish to allow its customers to have access to business data maintained by the telecommunications provider such as billing data, customer information, and product information, for example. Such data can be referred to collectively as data systems, back office information, or back office applications. Security measures would typically be put in place to ensure that customers are allowed access only to the network systems and data systems to which they are authorized. A customized set of security measures might be implemented for each customer, resulting in numerous different types of access procedures and security protocols.

SUMMARY OF THE INVENTION

A service access architecture to enable customer access to telecommunications provider services is provided. The service access architecture includes a service layer providing a standard interface for communication with customer applications to access network systems and data systems of the telecommunications provider. The service access architecture also includes a device/data layer maintaining the network systems and data systems of the telecommunications provider. The service access architecture includes an adaptation layer coupled to communicate, via at least one broker of the adaptation layer, with the service layer and to communicate, via at least one adapter of the adaptation layer, with the device/data layer, the adaptation layer operable to interface between the service layer and the device/data layer.

An alternative embodiment is a method for an application of a customer of a telecommunications provider to access the telecommunications provider's services. The method includes sending a request, by the customer application, to a service layer provided by the telecommunications provider, and the service layer sending the request to an adaptation layer provided by the telecommunications provider. The method provides for the adaptation layer sending the request to a device/data layer provided by the telecommunications provider, and the device/data layer fulfilling the request.

DETAILED DESCRIPTION OF THE PREFERRED EMBODIMENTS

Figure 1:
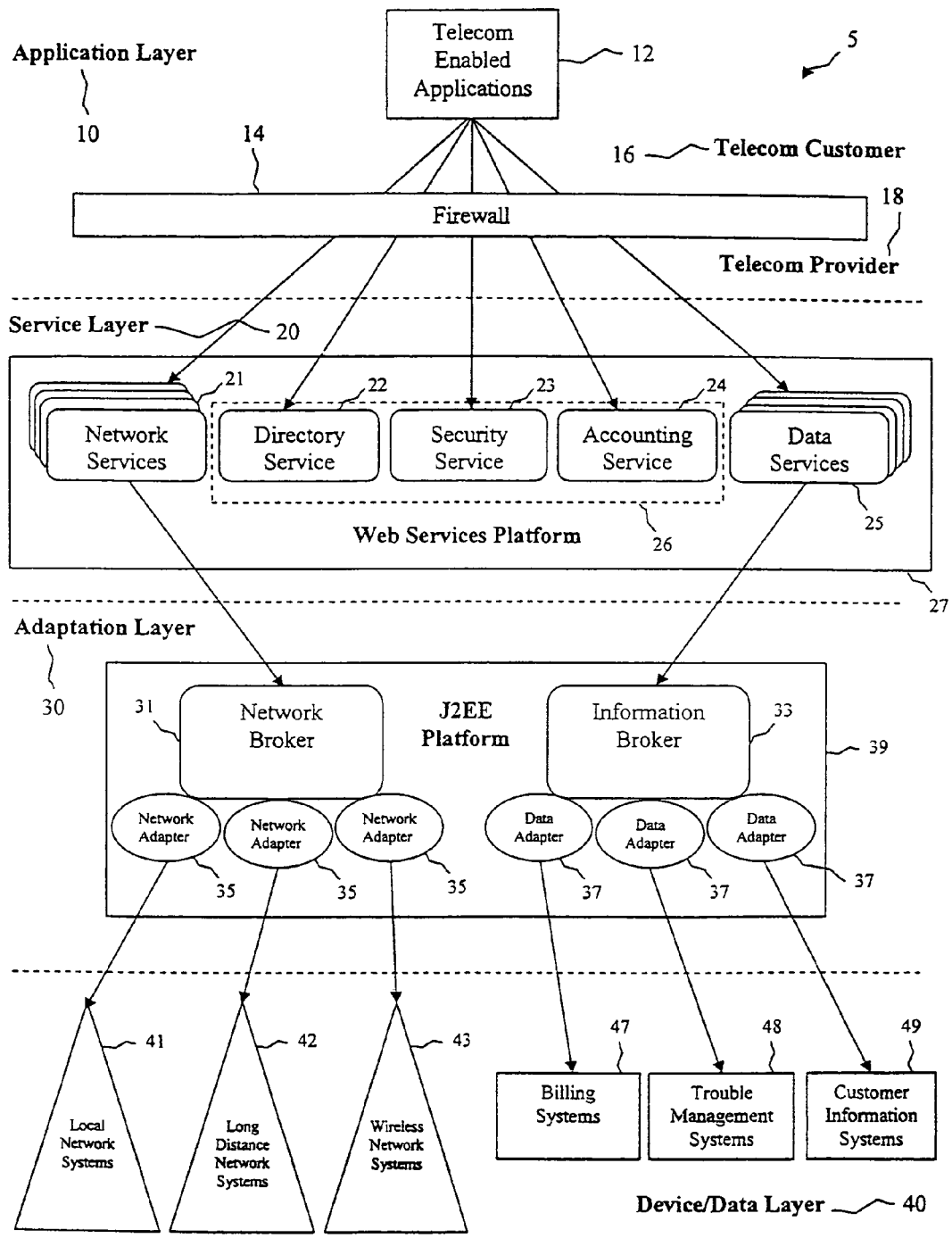
FIG. 1 is a block diagram of the service access architecture according to one embodiment.

Previously existing architectures for exposing network systems and data systems to external customers have several limitations. First, inadequate security mechanisms may exist to restrict access to the network systems and data systems. Also, the interfaces to the network systems and data systems may be non-standard, requiring customized procedures to set up communication. In addition, the protocols needed to interface with network devices may be highly complex. Also, there may be no central means of managing access to the network systems and data systems. Finally, there may be no consistent way to track customer usage of the network systems and data systems.

As an example of previously existing architecture, an outside company might establish a virtual private network (VPN) with a telecommunications provider as a means of securely accessing the telecommunications provider's services and data. The outside company might connect through the VPN directly to the telecommunications provider and use a customized application solution to obtain the desired service or data. A different company might have to establish another VPN and the custom solution, such as direct connection to a device, is typically not reusable by others.

Since these types of connections are made directly to the devices, knowledge of low-level network communication protocols would typically be needed on the part of the outside companies. If the telecommunications provider changed devices, the outside companies would typically need to employ different communication protocols for the new devices, possibly requiring the rewriting of large quantities of low-level programming code.

A multi-tiered approach that can be referred to as service access architecture addresses the above problems by managing access to business data and network capabilities in a centralized, controlled, and secured manner. The service access architecture provides an infrastructure that allows a telecommunications company to expose its network systems and its data systems to external customers as a set of services.

In this manner all customers are exposed to a consistent set of interfaces when accessing the telecommunications provider's network systems and data systems. The interfaces to the network and data systems are based on open standard technologies such as HTTP, XML, Web Services, or other common protocols. Layers of the service access architecture below these common interfaces handle the communications with the network systems and with the information repositories, or back office applications, that hold the business information. Thus, developers in the outside companies only need to know how to code to these common protocols. Knowledge is not needed of low-level network protocols and details of events at the layer where the network systems and data systems reside.

The outside companies can build their own applications to communicate with the interfaces to retrieve business data and use the telecommunications provider's services. This arrangement can eliminate the need for the telecommunications provider to create communications applications and customized security measures for the customers. This also decouples outside companies from the telecommunications provider's network capabilities and business data in the sense that changes in these back end services do not affect the customers.

Devices that can access the interfaces include wireless and wireline telephones, stand-alone and networked computers, PDA's, and other communication devices. The devices can use various operating systems such as Palm, J2ME, Pocket PC, and Microsoft Windows.

FIG. 1 depicts an embodiment of the service access architecture 5. In this embodiment, four layers are used to provide external customers 16 access to the internal network systems and data systems of a telecommunications provider 18: an application layer 10, a service layer 20, an adaptation layer 30, and a device/data layer 40.

The applications 12 of customers 16 that are using the service access architecture 5 reside in the application layer 10. This layer is located physically in a network that is external to that of the telecommunications provider 18. The applications 12 are typically next-generation, telecom-enabled applications.

One or more firewalls 14 may be present between the customers' applications 12 and the internal network systems and data systems of the telecommunications provider 18. That is, the telecommunications customer 16 may have a firewall protecting their network and the telecommunications provider 18 may have the firewall 14 protecting their network as well. The telecommunications provider 18 might have its own applications inside its firewall 14, allowing it to use the same services. For example, a web site for use by the customers 16 might be placed on the inside of the telecommunications provider's 18 firewall 14, but still within the application layer 10.

The service layer 20 exposes the telecommunications provider's 18 network systems and data systems as a set of services. Customers 16 are provided with a common set of interfaces with which to access the services in the service layer 20. The interfaces to the services and data are based on open standard technologies such as HTTP, XML, Java, Web Services, or other common protocols.

The service layer 20 consists of a network services domain 21, a data services domain 25, and a common services domain 26. The network services domain 21, which can also be referred to as telecom services, contains a set of services that provide access to the telecommunications provider's 18 network systems. A customer application 12 attempting to gain access to a particular network system via a network service can find the appropriate reference to the network service in the network services domain 21 by looking up the network service in a directory service 22.

The data services domain 25, which can also be referred to as information services, contains a set of services that provide access to the telecommunications provider's 18 data systems, such as customer data and product data. A customer application 12 attempting to gain access to a particular data system via a data service can find the appropriate reference to the data service in the data services domain 25 by looking up the data service in a directory service 22.

The common services domain 26 contains a set of common services that support the services in the other two domains. Components of the common services domain 26 can include a directory service 22, a security service 23, and an accounting service 24.

The security service 23 performs authentication and authorization when customer applications 12 attempt to access the network systems and data systems. All customer applications 12 pass through the same security service 23 regardless of whether the applications 12 are attempting to reach a network system or a data system.

The directory service 22 provides a means for an application 12 to locate and obtain a reference to a service so that the application can invoke methods on that service or make service invocations. Applications look up services using publicized names.

The accounting service 24 provides the telecommunications provider 18 with data regarding the level of usage of the service access architecture 5 by customer applications 12. This information can be used for billing purposes.

In the embodiment of FIG. 1, the service layer 20 is implemented on a Web Services platform 27, but other platforms could be used.

The adaptation layer 30 provides standardized interfaces between the service layer 20 and the device/data layer 40. It acts as a bridge between the specific protocols of the network systems and data systems on the device/data layer 40 and the network services 21 and data services 25 in the service layer 20. This provides a high degree of decoupling between the network/data services 21, 25 and the actual network and/or data systems being accessed. The adaptation layer 30 can consist of a network broker 31 and an information broker 33.

The network broker 31 component of the adaptation layer 30 provides the service layer 20 with a standardized interface to the underlying network systems. The interface provided by the network broker 31 is independent of the network system to which a request is being sent. The network broker 31 routes network requests to the appropriate network systems via a set of network adapters 35. The network broker 31 may consult a metadata repository of routing information to make routing decisions.

The network adapters 35 associated with the network broker 31 provide an abstraction layer to the actual device level protocols needed to interface with the network systems. That is, the network adapters 35 translate requests from the standard format received by the network broker 31 from the network services 21 into the low-level networking protocols used by the network systems. The network adapters 35 then send the requests to the appropriate network systems as directed by the network broker 31. This decoupling of the network systems from the network broker 31 allows the service access architecture 5 to support a plug-and-play approach to the connection of new network devices.

The information broker 33 component of the adaptation layer 30 provides the service layer 20 with a standardized interface to the underlying data systems. The interface provided by the information broker 33 is independent of the data system to which a request is being sent. The information broker 33 routes information requests to the appropriate data system via a set of data adapters 37. The information broker 33 may consult a metadata repository of routing information to make routing decisions.

The data adapters 37 associated with the information broker 33 provide an abstraction layer to the actual back office application programming interfaces (APIs) needed to interface with the data systems. That is, the data adapters 37 translate requests from the standard format received by the information broker 33 from the data services 25 into the APIs used by the data systems. The data adapters 37 then send the requests to the appropriate data systems as directed by the information broker 33. This decoupling of the data systems from the information broker 33 allows the service access architecture 5 to support a plug-and-play approach to the connection of new back office applications.

In the embodiment of FIG. 1, the adaptation layer 30 is implemented on a J2EE platform 39, but other platforms could be used.

The device/data layer 40 contains the network systems and data systems that the telecommunications provider 18 wishes to expose to its customers 16. In the embodiment of FIG. 1, the network systems are local network systems 41, long distance network systems 42, and wireless network systems 43, but other types and quantities of services could be present. The data systems shown are billing systems 47, trouble management systems 48, and customer information systems 49, but other types and quantities of applications could be present.

The network adapters 35 typically use various low-level network protocols such as SS7, LIF, AAL5, SIP, and X.25 to access the network systems 41, 42, and 43. The data adapters 37 typically use various APIs such as CORBA, ODBC, MQSeries, and RMI to access the data systems 47, 48, and 49.

When communication is established between a network adapter 35 and a network system 41, 42, or 43, a customer application 12 is able to access the system 41, 42, or 43 via the network services 21 and the network broker 31. Similarly, when communication is established between a data adapter 37 and a data system 47, 48, or 49, a customer application 12 is able to access the data system 47, 48, or 49 via the data services 25 and the information broker 33.

In an example, a customer application 12 might request access to a wireless network system 43 of a telecommunications provider 18. The request would pass from the application 12 to the firewall 14 set up by the customer. If the customer authorizes the request to pass through their firewall, the request is routed to the firewall 14 of the telecommunications provider 18. If the customer application 12 is authorized to cross the firewall 14, the request continues on to the service layer 20. The security service 23 of the service layer 20 then determines if the customer application 12 is authentic and is authorized to have access to the requested system 43.

If the customer application 12 is authenticated and authorized, the application 12 uses the directory service 22 to obtain a reference to the desired network service 43. The customer application 12 then uses the reference to send a request to network services. The network service then forwards the request to the network broker 31 in the adaptation layer 30. The accounting service 24 in the service layer 20 might record that the customer application 12 has made the request.

Upon receiving the request, the network broker 31 consults its metadata repository to determine the network system to which the request should be sent. In this example, the request is being sent to a wireless network system 43. After determining the appropriate network system, the network broker 31 sends the request to the network adapter 35 for that system. The network adapter 35 translates the request from the format in which it was received from the network broker 31 into the format of the wireless network system 43. The network adapter 35 then sends the request to the wireless network system 43 and the application 12 is thus given access to the requested system 43.

Any data that might be provided to the customer application 12 by the network system 43 would be returned to the application 12 along the same path through which the request flowed. A status describing whether or not the request was completed successfully might also be returned to the customer application 12 along the same path by which the request was sent to the network system 43. In cases where the network system 43 performs a function without returning any data to the customer application 12, the status alone might be returned.

A request from a customer application 12 for information in a data system 47, 48, or 49 would be handled in a similar manner. That is, after passing through the firewall 14, the request would be sent to the service layer 20. Upon the security service 23, directory service 22, and accounting service 24 performing the functions described above, the request is sent to the information broker 33 in the adaptation layer 30.

Upon receiving the request, the information broker 33 consults its metadata repository to determine the data system to which the request should be sent. After determining the appropriate data system 47, 48, or 49, the information broker 33 sends the request to the data adapter 37 for that data system 47, 48, or 49. The data adapter 37 translates the request from the format in which it was received from the information broker 33 into the API of the appropriate data system 47, 48, or 49. The data adapter 37 then sends the request to the data system 47, 48, or 49 and the customer application 12 is thus given access to the requested data system 47, 48, or 49.

As described above, any data that is returned to the customer application 12 and any statuses regarding the success or failure of a data request would be returned to the application 12 along the same path through which the data request flowed.

In this way, outside companies are allowed to use the network capabilities of a telecommunications provider and to have access to data held by the telecommunications provider. Instead of each customer having its own pipeline with customized technology and security for accessing data and services, the service access architecture provides a common, cohesive form that is the same for all customers. A customer can make a request in a standard, high-level language and the service access architecture can fulfill the request without the need for the customer to be aware of the low-level details that occur within the network devices and back office applications belonging to the telecommunications provider. Further, the present disclosure allows each of the layers, particularly the service layer 20, adaptation layer 30, and device/data layer 40 to evolve and be modified or upgraded without impacting the other or adjacent layers.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A service access architecture to enable an outside company access to telecommunications provider services, comprising:

a service layer implemented on a web services platform, the service layer providing a set of services that expose the telecommunications provider's network systems and data systems that are accessible through a set of standard interfaces for communication with one or more applications developed by the outside company to access the network systems and the data systems of the telecommunications provider, and the service layer further providing authentication of customer access, wherein the one or more applications are developed to use at least some of the set of services provided by the service layer through communication with at least some of the set of standard interfaces, whereby the service layer decouples the one or more applications developed to use at least some of the set of services from the network systems and the data systems of the telecommunications provider;

the set of services provided by the service layer includes a network services domain, a data services domain and a common services domain, wherein the common services domain provides services that support the network services domain and the data services domain, and wherein the service layer executes on at least one computer system;

a device/data layer maintaining the network systems and data systems of the telecommunications provider, wherein the device/data layer executes on at least one of the network systems and the data systems;

an adaptation layer configured to interface between the service layer and the device/data layer, comprising a plurality of network adapters and at least one network broker and a plurality of data adapters and at least one information broker, the adaptation layer coupled to communicate with the network services domain in the service layer via the at least one network broker and to communicate with the data services domain in the service layer via the at least one information broker, and to communicate with the device/data layer via the plurality of network adapters and the plurality of data adapters, wherein each of the plurality of network adapters couples to only one of the network systems and each of the plurality of data adapters couples to only one of the data systems and the adaptation layer executes on at least one computer system.

2. The service access architecture of claim 1 wherein the network services domain provides services for routing a request for one of the network systems from at least one of the one or more applications developed by the outside company to the network broker in the adaptation layer.

3. The service access architecture of claim 1 wherein the data services domain provides services for routing a request for one of the data systems from at least one of the one or more applications developed by the outside company to the information broker in the adaptation layer.

4. The service access architecture of claim 1 wherein the common services domain comprises:

a directory service configured to promote at least one of the one or more of the applications developed by the outside company to locate and obtain references to network services in the network services domain and data services in the data services domain located in the service layer so that the at least one of the one or more of the applications developed by the outside company can invoke methods on the network services and data services;

a security service configured to authenticate and authorize at least one of the one or more of the applications developed by the outside company to access the network systems and data systems of the telecommunications provider; and an accounting service configured to record usage levels by at least one of the one or more of the applications developed by the outside company.

5. The service access architecture of claim 4 wherein the accounting service is used for billing purposes.

6. The service access architecture of claim 4 wherein the directory service is configured to promote the one or more applications developed by the outside company to locate and obtain a reference to a service using a name of the service.

7. The service access architecture of claim 1 wherein the service layer comprises:

the network services domain provides services for routing a request for one of the network systems from at least one of the one or more applications developed by the outside company to the network broker in the adaptation layer;

the data services domain provides services for routing a request for one of the data systems from at least one of the one or more applications developed by the outside company to the information broker in the adaptation layer;

a directory service configured to promote the at least one of the one or more of the applications developed by the outside company to locate and obtain references to network services in the network services domain and data services in the data services domain located in the service layer so that the at least one of the one or more of the applications developed by the outside company can invoke methods on the network services and data services;

a security service configured to authenticate and authorize the at least one of the one or more of the applications developed by the outside company to access the network systems and data systems of the telecommunications provider; and an accounting service configured to record usage levels by the at least one of the one or more of the applications developed by the outside company.

8. The service access architecture of claim 1 wherein the adaptation layer comprises:

the network broker configured to route a request for one of the network systems from the network services domain in the service layer to an appropriate network system in the device/data layer; and the information broker configured to route a request for one of the data systems from the data services domain in the service layer to an appropriate data system in the device/data layer.

9. The service access architecture of claim 8 further comprising:

one of the plurality of the network adapters coupled to the network broker translate the request for one of the data network systems from a data format used by the network broker to a data format used by the appropriate network system to which the request is routed; and one of the plurality of the data adapters coupled to the information broker translate the request for one of the data systems from a data format used by the information broker to a data format used by the appropriate data system to which the request is routed.

10. The service access architecture of claim 9 wherein the adaptation layer is implemented on a J2EE platform.

11. The service access architecture of claim 9 wherein each of the plurality of the network adapters is coupled to the network broker and configured to translate the request for the one of the network systems from a data format used by the network broker to a data format used by the one of the network systems to which the network adapter is coupled, and each of the plurality of the data adapters is coupled to the information broker and configured to translate the request for the one of the data systems from a data format used by the data broker to a data format used by the one of the data systems to which the data adapter is coupled.

12. A method for an application developed by an outside company to enable the outside company to gain access to the telecommunications provider's services, the method comprising:

sending requests, by the application developed by the outside company, to a service layer implemented on a web services platform and provided by the telecommunications provider, the service layer further providing a set of services that expose the telecommunications provider's network systems and data systems that are accessible through a set of standard interfaces, wherein the application is developed to use at least some of the set of services provided by the service layer by communicating through at least some of the set of standard interfaces of the service layer, whereby the service layer decouples the application developed to use at least some of the set of services from the telecommunications provider's network systems and data systems;

the services provided by the service layer including a network services domain, a data services domain, and a common services domain, wherein the common services domain provides services that support the network services domain and the data services domain, and wherein the requests are sent to network services in the network services domain or data services in the data services domain;

the service layer authenticating the requests through a service in the common services domain;

the service layer sending the requests to one of a network broker and an information broker in an adaptation layer provided by the telecommunications provider;

the adaptation layer sending the requests to a device/data layer provided by the telecommunications provider via one of a plurality of network adapters and a plurality of data adapters; and the device/data layer fulfilling the request.

13. The method of claim 12 further comprising:

routing, by the network services domain in the service layer, a request for a network service from the application developed by the outside company to the network broker in the adaptation layer;

routing, by the data services domain in the service layer, a request for a data service from the application developed by the outside company to the information broker in the adaptation layer; and the common services domain in the service layer providing services to both the network services domain and the data services domain.

14. The method of claim 13 wherein the services provided by the common services domain comprise:

a directory service configured to promote the application developed by the outside company to locate and obtain references to network services in the network services domain and data services in the data services domain located in the service layer so that the application developed by the outside company can invoke methods on the network services and data services;

a security service authenticating and authorizing the application developed by the outside company attempting to access the network services in the network services domain and data services in the data services domain; and an accounting service recording the level of usage of the network services in the network services domain and data services in the data services domain by the application developed by the outside company.

15. The method of claim 14 further comprising:

the network broker in the adaptation layer routing each of the requests for network services from the network services domain in the service layer to an appropriate network service; and information broker in the adaptation layer routing each of the requests for data services from the data services domain in the service layer to an appropriate data service.

16. The method of claim 15 further comprising:

one of the plurality of the network adapter coupled to the network broker translating each of the requests for network services from a data format used by the network broker to a data format used by the appropriate network service to which the request is routed; and one of the plurality of the data adapter coupled to the information broker translating each of the requests for data services from a data format used by the information broker to a data format used by the appropriate data service to which the request is routed.

17. The method of claim 12 further comprising:

the network broker in the adaptation layer routing each of the requests for network services from the network services domain in the service layer to an appropriate network service; and the information broker in the adaptation layer routing each of the requests for data services from the data services domain in the service layer to an appropriate data service.

18. The method of claim 17 further comprising:

one of the plurality of the network adapters coupled to the network broker translating each of the requests for the network services from a data format used by the network broker to a data format used by the appropriate network service to which the request is routed; and one of the plurality of the data adapters coupled to the information broker translating each of the requests for the data services from a data format used by the information broker to a data format used by the appropriate data service to which the request is routed.

19. A method of accessing a device/data layer, comprising:

an application developed by the outside company sending a first request to a service layer implemented on a web services platform and provided by a telecommunications provider, the service layer further providing a set of services that expose the telecommunications provider's devices that are accessible through a set of standard interfaces, wherein the application developed by the outside company is configured to enable the outside company to gain access to the telecommunications provider's devices by way of at least some of the set of services provided by the service layer through communication with at least some of the set of standard interfaces, whereby the service layer decouples the application developed by the outside company from the telecommunications provider's devices;

the services provided by the service layer including a network services domain, a data services domain, and a common services domain, wherein the common services domain provides services that support the network services domain and the data services domain;

the service layer authenticating the first request;

the service layer sending the first request to an adaptation layer provided by the telecommunications provider;

the adaptation layer sending the first request via a first network adapter to a first device in the device/data layer provided by the telecommunications provider, the first network adapter providing a first abstraction layer that translates the first request from the at least some of the set of standard interfaces to a low-level networking protocol associated with the first device;
the first device fulfilling the first request;
adding a second device in the device/data layer and a second network adapter to the adaptation layer;
the application developed by the outside company sending a second request to the service layer;
the service layer authenticating the second request;
the service layer sending the second request to the adaptation layer;
the adaptation layer sending the second request via the second network adapter to the second device in the device/data layer, the second network adapter providing a second abstraction layer that translates the second request from the at least some of the set of standard interfaces to a low-level networking protocol associated with the second device; and
the second device fulfilling the second request.

20. The method of claim 19, further comprising:
upgrading the first network adapter;
the application developed by the outside company sending a third request to the service layer;
the service layer authenticating the third request;
the service layer sending the third request to the adaptation layer;
the adaptation layer sending the third request via the first network adapter to the first device in the device/data layer; and
the device/data layer fulfilling the third request.

21. The method of claim 19 further comprising:
routing, by the network services domain in the service layer, the first request for a network service from the application developed by the outside company to a network broker in the adaptation layer;
routing, by the data services domain in the service layer, a fourth request for a data service from the application developed by the outside company to an information broker in the adaptation layer; and
the common services domain in the service layer providing services that support the network services domain and the data services domain wherein the services provided by the common services domain comprise:
  a directory service configured to promote the application developed by the outside company to locate and obtain references to network services and data services by name of the services so that the application developed by the outside company can invoke methods on the network services and data services;
  a security service authenticating and authorizing the application developed by the outside company attempting to access the network services and data services; and
  an accounting service recording the level of usage of the network services and data services by the application developed by the outside company wherein the information about the level of usage of the network services and data services is used for billing purposes.

* * * * *

UNITED STATES PATENT AND TRADEMARK OFFICE
CERTIFICATE OF CORRECTION

PATENT NO. : 7,617,293 B1  
APPLICATION NO. : 10/848240  
DATED : November 10, 2009  
INVENTOR(S) : Barnes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this

Nineteenth Day of October, 2010

David J. Kappos  
*Director of the United States Patent and Trademark Office*